US012005598B2

(12) United States Patent
Jakob

(10) Patent No.: US 12,005,598 B2
(45) Date of Patent: Jun. 11, 2024

(54) TELESCOPIC COMPRESSION DEVICE AND EXCHANGE TOOL OF FLAT BED DIE-CUTTING MACHINES, FLAT BED STRIPPING MACHINES OR PART SEPARATING MACHINE

(71) Applicant: BOXPLAN GmbH & Co.KG, Steisslingen (DE)

(72) Inventor: Tobias Jakob, Radolfzell (DE)

(73) Assignee: BOXPLAN GmbH & Co.KG, Steisslingen (DE)

(*) Notice: Subject to any disclaimer, the term of this patent is extended or adjusted under 35 U.S.C. 154(b) by 158 days.

(21) Appl. No.: 17/594,565

(22) PCT Filed: Apr. 1, 2020

(86) PCT No.: PCT/EP2020/025154
§ 371 (c)(1),
(2) Date: Oct. 22, 2021

(87) PCT Pub. No.: WO2020/216467
PCT Pub. Date: Oct. 29, 2020

(65) Prior Publication Data

US 2022/0203566 A1 Jun. 30, 2022

(30) Foreign Application Priority Data

Apr. 25, 2019 (EP) .................................... 19020307

(51) Int. Cl.
*B26D 7/00* (2006.01)
*B26D 1/00* (2006.01)
(Continued)

(52) U.S. Cl.
CPC ......... *B26D 1/0006* (2013.01); *B26D 7/0006* (2013.01); *B26D 7/1818* (2013.01);
(Continued)

(58) Field of Classification Search
CPC .. B26D 1/0006; B26D 7/0006; B26D 7/1818; B26D 2001/0053; B26D 2001/006;
(Continued)

(56) References Cited

U.S. PATENT DOCUMENTS 3,606,357 A * 9/1971 Yonkers ................ F16B 43/001
277/637
3,977,281 A 8/1976 Lewthwaite
(Continued)

FOREIGN PATENT DOCUMENTS

CN 1684780 A 10/2005
CN 201483688 U 5/2010
(Continued)

OTHER PUBLICATIONS

International Search Report issued Mar. 7, 2020 in corresponding International Application No. PCT/EP2020/025154 (3 pages).

*Primary Examiner* — Jonathan G Riley
(74) *Attorney, Agent, or Firm* — Bookoff McAndrews, PLLC

(57) ABSTRACT

A telescopic compression device (10) for flat bed die-cutting, stripping and part separating machines is provided, comprising a socket (12), at least one guide element (14, 15) which is slidably guided in the socket (12) and an elastic bias means (34) which biases the at least one guide element (14, 15) towards a furthest extended position and an elastic security element (44) which has an inherent stiffness and secures the at least one guide element (14, 15) to the socket (12). Furthermore, an exchange tool (2) of flat bed die-cutting machines, flat bed stripping machines or part separating machines is provided.

13 Claims, 4 Drawing Sheets

Figure 1:
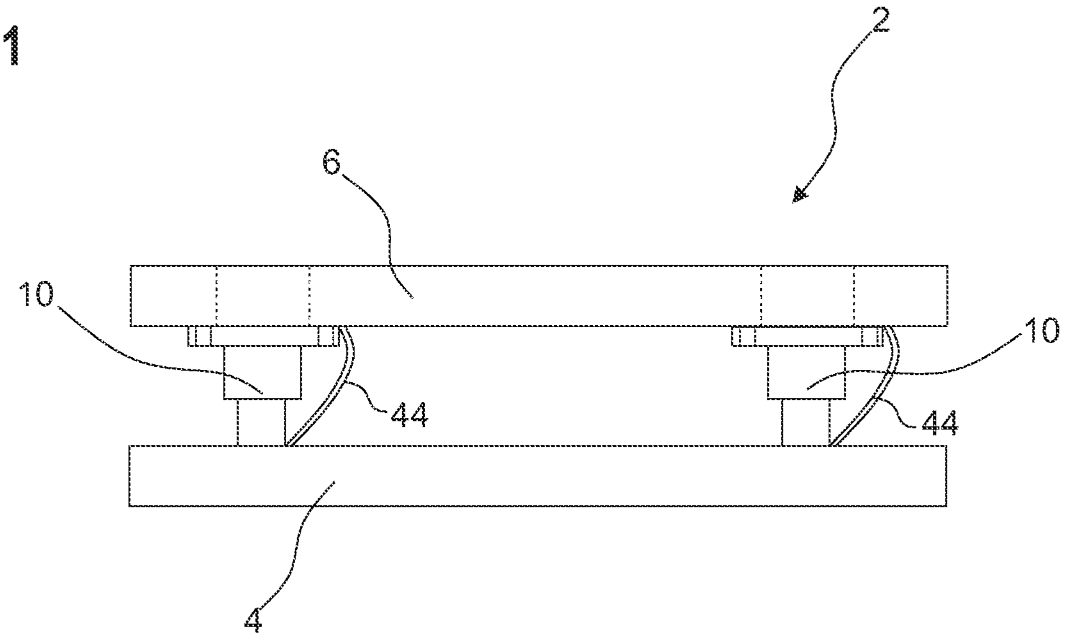

(51) Int. Cl.
*B26D 7/18* (2006.01)
*B26F 1/40* (2006.01)
*B26F 1/44* (2006.01)

(52) U.S. Cl.
CPC .................. *B26F 1/40* (2013.01); *B26F 1/44* (2013.01); *B26D 2001/0053* (2013.01); *B26D 2001/006* (2013.01); *B26F 2001/4409* (2013.01)

(58) Field of Classification Search
CPC .......... B26D 2210/02; B26F 1/40; B26F 1/44; B26F 2001/4409; B30B 15/04; B30B 1/00; B30B 15/041; B30B 15/045; B21D 28/00
See application file for complete search history.

(56) References Cited

U.S. PATENT DOCUMENTS

| | | | |
|---|---|---|---|
| 4,759,537 A | 7/1988 | Illig et al. | |
| 2005/0070420 A1* | 3/2005 | Steiner ................. | B26D 7/1818 225/105 |

FOREIGN PATENT DOCUMENTS

| | | | |
|---|---|---|---|
| CN | 203045818 U | 7/2013 |
| CN | 105626972 A | 6/2016 |
| CN | 108790051 A | 11/2018 |
| DE | 202006017644 U1 | 2/2007 |
| DE | 202008002306 U1 | 5/2008 |

* cited by examiner

A-A

E-E

TELESCOPIC COMPRESSION DEVICE AND EXCHANGE TOOL OF FLAT BED DIE-CUTTING MACHINES, FLAT BED STRIPPING MACHINES OR PART SEPARATING MACHINE

CROSS-REFERENCE TO RELATED APPLICATION(S)

This application is a National Stage under 35 U.S.C. § 371 of International Application No. PCT/EP2020/025154, filed Apr. 1, 2020, which claims priority to European Patent Application No. 19020307.5, filed Apr. 25, 2019, the contents of all of which are incorporated by reference in their entirety.

The invention relates to a telescopic compression device for flat bed die-cutting machines, flat bed stripping machines or part separation machines and an exchange tool for the same.

Flat bed die-cutting machines, flat bed stripping machines or part separation machines may be part of a production line in which paper, cardboard, corrugated board or plastic are processed, for example for packaging. For example, a plurality of blanks on the same sheet are die-cut and subsequently separated in a flat bed die-cutting machine with an adjoining flat bed stripping device.

In order to enable the processing of different packaging, an exchangeable tool which is specific for a kind of packaging to be processed is mounted in the respective machine. For flat bed die-cutting machines, for example, these tools are pressure plates which have cutting knives or pressure pads attached thereto.

The pressure plates are in turn respectively attached to a carrier plate in a spring loaded manner by means of telescopic compression devices.

It is essential that the machines work with very high precision. The exchange tool must be exactly adapted to the pressure applied and aligned with the edges of cut in the preceding station. If upper and lower exchange tools are provided, as it is the case in the die-cutting or stripping machines, these tools further need to be precisely aligned with each other.

However, since high loads occur in the production process, the compression devices may fail. In particular, an elastic bias means which is arranged in the compression device and provides for the spring loaded support of the pressure plate may break. This leads to a malfunction of the compression device which in turn may lead to a misalignment of the pressure plate. This results not only in deficient products, but may also lead to a damage of the machine itself.

It is therefore an object of the invention to provide a compression device as well as an exchange tool for flat bed die-cutting, stripping and part separating machines which is particularly reliable.

This object is achieved by a telescopic compression device for flat bed die-cutting, stripping and part separating machines comprising a socket, at least one guide element which is slidably guided in the socket and an elastic bias means which biases the at least one guide element towards a furthest extended position and an elastic security element which has an inherent stiffness and secures the at least one guide element to the socket.

By means of the elastic security element the telescopic compression device may still provide sufficient support for a pressure plate of an exchange tool such that a grave damage of a flat bed die-cutting, stripping or part separating machines is inhibited, even if the elastic bias means of the compression device has failed. Thereby, a worker attending to the respective machine has enough time to recognize the fail of the bias means and may stop the machine in time for maintenance, in particular for exchanging the defective compression device.

Due to its elasticity and inherent stiffness, the security element may be elastically deformed during an operation of a machine, in particular when the compression device is compressed, and at the same time provide sufficient stability of the compression device when the bias means has failed.

According to one embodiment, the security element at least partially encompasses the guide element and/or the socket. Thereby, the guide element is secured to the socket by the security element such that it may not disengage from the socket. A pressure plate of an exchange tool attached to the compression device may remain sufficiently aligned.

For example, the security element is a clamp. Thereby, the security element may be attached to the compression device easily.

The socket may comprise a flange and the security element may comprise a support element which abuts against a surface of the flange facing in a direction away from the guide element. Thus, due to the support element abutting against the flange, the security element may be attached to the socket in a defined axial position.

The flange of the socket may serve for fastening the socket for example to a carrier plate of an exchange tool. Therefore, the flange may comprise a through hole for enabling screwing the flange to a carrier plate.

The support element of the security element may comprise a through hole which is congruent with the through hole of the flange. Thereby, the support element may be fixed in an exchange tool upon fixing the compression device in the exchange tool.

When the compression device is fixed in an exchange tool, the support element is clamped between a carrier plate and the flange of the socket.

The flange is for example arranged with a distance to an end face of the socket or a bottom of the socket. Thus, the socket may be at least partially countersunk into a hole in a carrier plate of an exchange tool.

The geometry of the support element may be adapted to the geometry of the socket, in particular such that the support element may be aligned at the socket.

According to one embodiment, the security element may engage with the socket in a form fitting manner, in particular such that the security element may not disengage from the socket during an operation mode of the machine even if the security element is elastically deformed.

The support element may comprise a flat surface.

The security element for example comprises a ring which abuts against an axial end face of the guide element that faces away from the socket. Thereby, the guide element is secured to the socket. The ring allows an attachment of the compression device to a pressure plate in a known manner, i.e. by means of a screw screwed into the guide element. The screw may extend through the ring, thereby fixing the ring in a none releasable manner between the guide element a pressure plate. That means when the compression device is fastened in an exchange tool, the security element may not be released from the compression device in a non-destructive manner.

According to one embodiment, the security element comprises at least one bracket, in particular two brackets, which connects the support element and the ring. By means of the at least one bracket connecting the support element and the ring, the guide element may be secured to the socket.

The bracket may be relatively thin, in particular a cross section of the bracket may be such that the bracket may flex easily. Thereby, a breakage of the bracket upon a deformation of the security element is inhibited and the security element may be particularly reliable.

Preferably, the bracket is arched. Thereby, the elastic deformation of the security element may take place in a particular manner. The deformation path of the security element may be identically during each compression of the compression device.

According to one embodiment, the security element is a rod. Such a security element may be produced cost effective.

The rod may extend from a free end of the guide element up to the socket, thereby securing the guide element to the socket in a reliable manner.

The rod may be curved in order to facilitate a deflection of the rod.

According to one embodiment, the rod is inclined to a longitudinal axis of the compression device. Thereby, the rod may flex more easily when an axial force is applied on the compression device.

Preferably, the security element comprises thermoplastic polyurethane or consists of thermoplastic polyurethane. A security element comprising or consisting of such a material has sufficient flexibility to be elastically deformed and in the same time has sufficient inherent stability to reliably secure the guide element to the socket.

For example, the security device is formed as one piece. Thereby, the security element may be easily produced in high quantities, for example in an injection moulding process.

The compression device may comprise at least two guide elements which are arranged telescopically with respect to one another and are slidable into the socket against the force of the elastic bias means. Thereby, a compression ratio of the compression device may be increased compared to the use of a compression device with only one guide element.

The object of the invention is further achieved by an exchange tool of flat bed die-cutting machines, flat bed stripping machines or part separating machines, comprising a carrier plate in which at least one through-hole is formed, in which an inventive compression device is inserted such that it protrudes from the carrier plate, and comprising a pressure plate that is mounted at a free end of the compression device. The pressure plate may be aligned to the carrier plate very precisely due to the inventive compression device, even if the bias means of the compression device fails.

Figure 2:
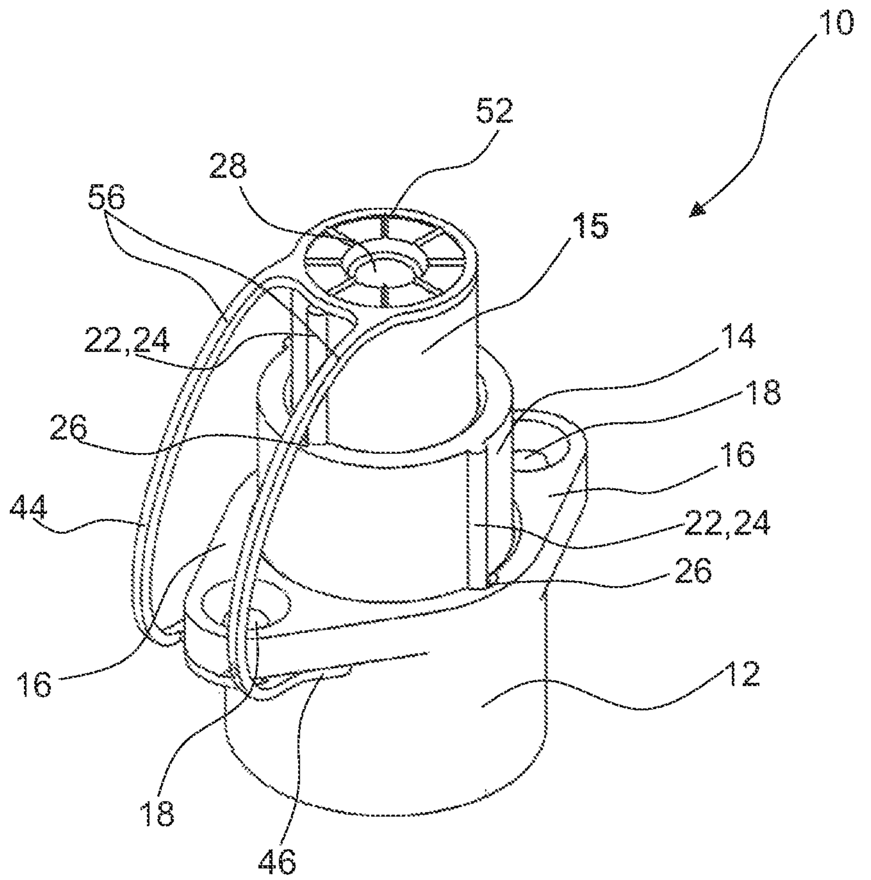
Figure 3:
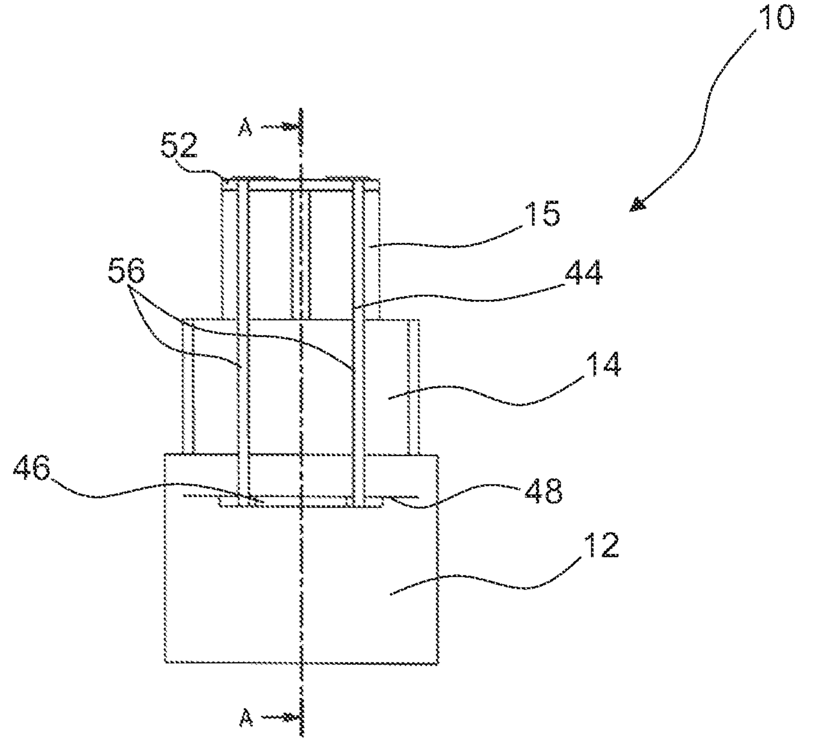
Figure 4:
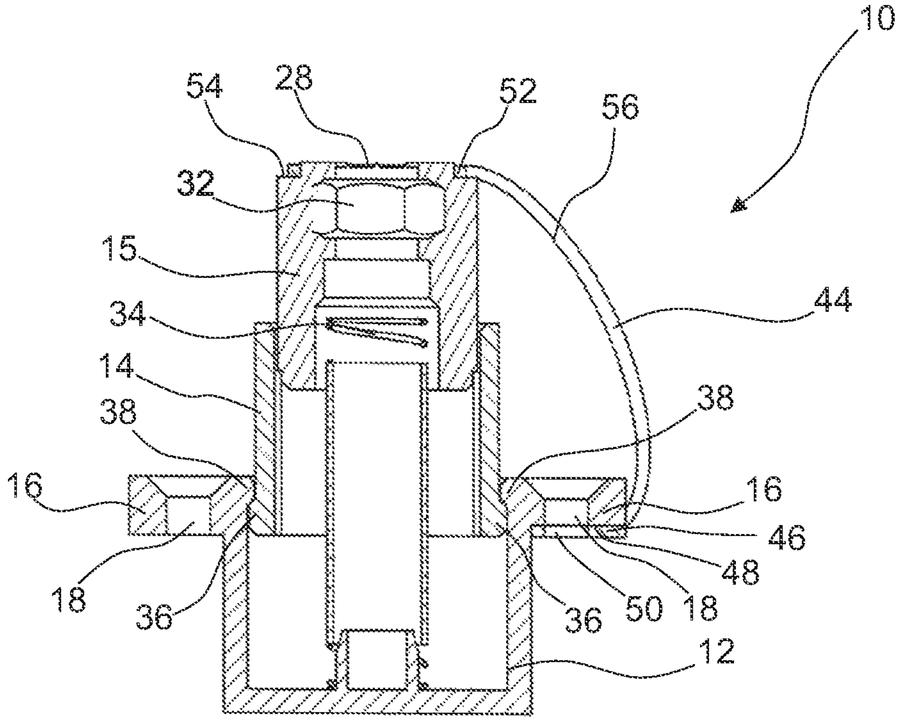

Further features and advantages of the invention can be derived from the following description and from the attached drawings. In the drawings FIG. 1 shows an inventive exchange tool in a schematic side view, FIG. 2 shows a compression device according to an inventive embodiment, FIG. 3 shows the compression device of FIG. 2 in a side view, FIG. 4 shows a section through the compression device along line A-A in

Figure 5:
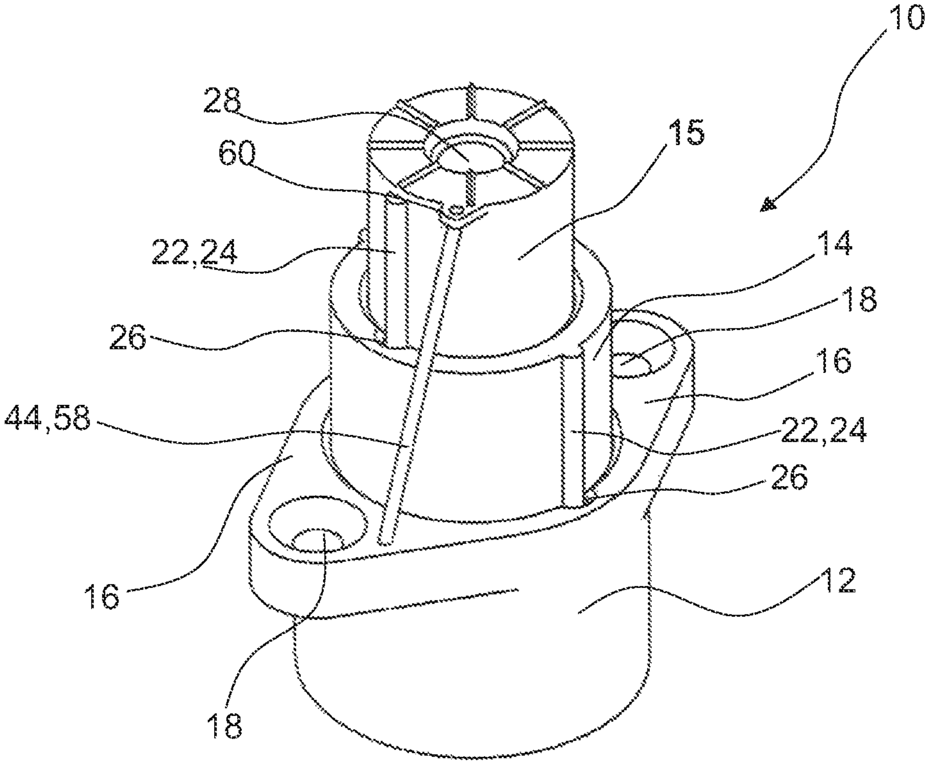
Figure 6:
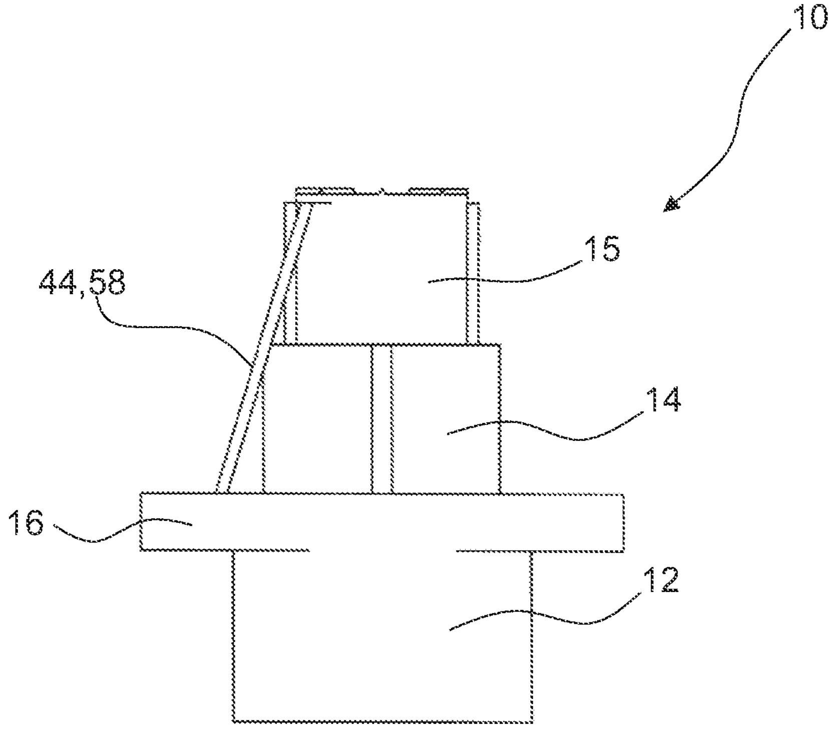
Figure 7:
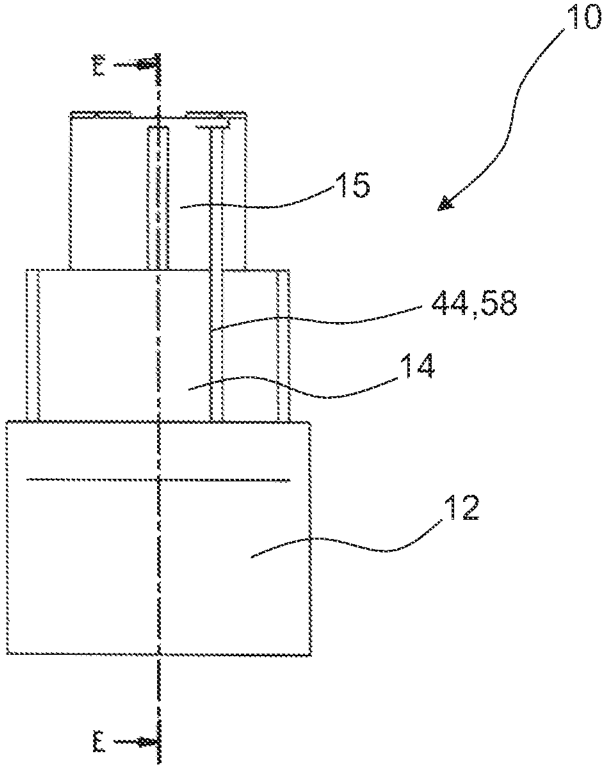
Figure 8:
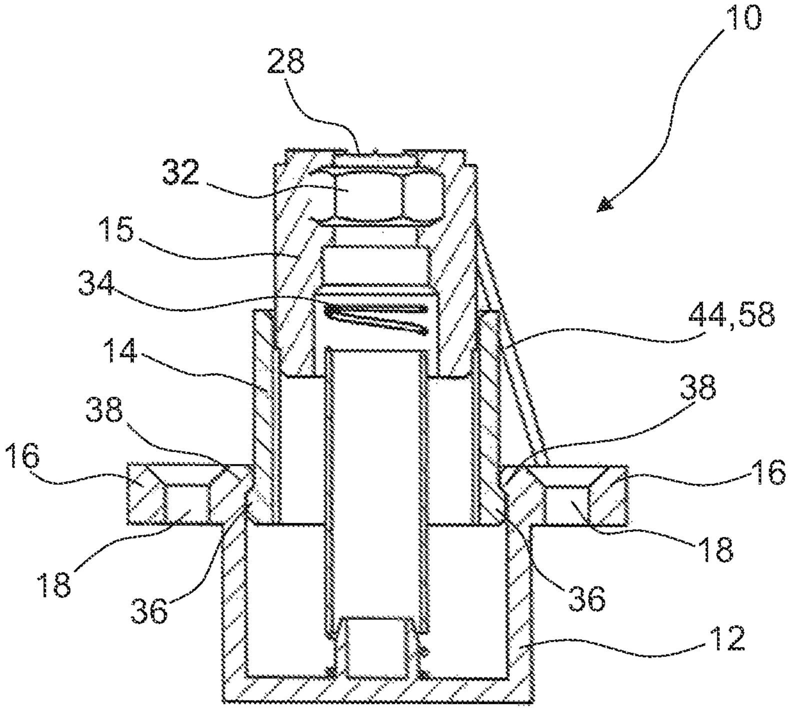

FIG. 3,

FIG. 5 shows a compression device according to a further inventive embodiment, FIG. 6 shows the compression device of FIG. 5 in a side view, FIG. 7 shows the compression device of FIGS. 5 and 6 in a further side view, and FIG. 8 shows a section through the compression device along line E-E in FIG. 6.

FIG. 1 shows an exchange tool 2 for a flat bed die-cutting, stripping or part separating machine. The exchange tool 2 comprises a pressure plate 4 and a carrier plate 6. The pressure plate 4 is fastened to the carrier plate 6 by means of several telescopic compression devices 10.

An inventive telescopic compression device 10 is shown in FIG. 2 in a perspective view. FIG. 3 shows a side view of the compression device 10.

The pressure plate 4 is aligned with respect to the carrier plate 6 in a very precise manner.

As is obvious from FIGS. 2 and 3, the compression device 10 comprises a socket 12 and two guide elements 14, 15. The guide elements 14, 15 are arranged telescopically with respect to one another and are slidable into the socket 12.

The socket 12 and the guide elements 14, 15 are for example injection moulded parts, in particular comprising or consisting of Polyoxymethylen.

The socket 12 is cup-shaped in the shown embodiment.

On two opposite sides of the socket 12, a radially extending flange 16 is formed respectively. Each flange 16 comprises a through hole 18, to be fastened to the exchange tool 2, in particular to the carrier plate 6, for example by means of screwing.

Each flange 16 is arranged with a distance to an end face of the socket 12 or a bottom of socket 12. Thus, the compression device 10, respectively the socket 12, may be arranged at least partially in a through hole of the carrier plate 6, as shown in FIG. 1 by means of a press-fit.

Each of the guide elements 14, 15 comprises an anti-rotation lock 22, which is achieved by at least one elongated nose 24 formed at an outer surface each guide element 14, 15 and extending in an axial direction of the compression device 10. Each nose 24 is slidably engaged in a corresponding groove 26 of the socket 12 of the other one of the guide elements 14.

The outermost one of the two guide elements 15 comprises a screw hole 28 for screwing the pressure plate 4 of the exchange tool 2 to the compression device 10.

As can be seen in FIG. 4, which shows a section through the compression device 10, a nut 32 is embedded in the outermost guide element 15 in the area of the screw hole 28 for providing a reliable screw connection.

The compression device 10 further comprises an elastic bias means 34 (see FIG. 4), which biases the guide elements 14, 15 towards a furthest extended position. The bias means 34 is for example a helical spring. In the Figures, the guide elements 14, 15 are always depicted in the furthest extended position.

FIG. 4 furthermore shows that the intermediate guide element 14 which is positioned between the socket 12 and the other guide element 15 has the form of a sleeve. Thereby, the outermost guide element 15 may slide into the intermediate guide element 14 when the compression device 10 is compressed.

In order to secure the guide elements 14, 15 to the socket 12 the intermediate guide element 14 comprises lateral protrusions 36 which engage behind respective protrusions 38 which are formed at in inner surface of the socket 12.

The outermost guide element 15 has respective lateral protrusions which engage behind protrusions on an inner surface of the intermediate guide element 14. These are not visible in FIG. 4 because they are displaced about 90° relative to the protrusions 36, 38 of the intermediate guide element 14 and the socket 12.

In order to assemble the compression device 10, the bias means 34 is arranged in the socket 12 and the guide elements 14, 15 are stacked on the socket 12. Afterwards, the socket 12 and the guide elements 14, 15 are pressed together. Due to a slight elasticity of the socket 12 and the guide elements 14, 15, the protrusions 36 of the intermediate guide element 14 snap behind the protrusion 38 of the socket 12 and the protrusions of the outermost guide element 15 snap behind the protrusions in the intermediate guide element 15.

When the compression device 10 is assembled, the guide elements 14, 15 cannot be released from the socket 12 in a non-destructive manner.

When a force acts on the compression device 10, the guide elements 14, 15 may telescopically slide into the socket 12 against the force of the bias means 34.

During operation of a flat bed die-cutting, stripping or part separating machine, the compression device 10 may be compressed with a repetition rate of three times a second or even more. Thus, the compression device 10 may be subjected to heavy loads. Therefore, it may happen that the compression device 10 fails. Usually, at first the bias means 34 fails before the complete compression device 10 fails due to the ceased elastic force of the bias means 34.

In order to inhibit a misalignment of the pressure plate 4 to the carrier plate 6, the compression device 10 comprises an elastic security element 44, which has an inherent stiffness and secures the guide elements 14, 15 to the socket 12.

By means of the security element 44, the pressure plate 4 may stay aligned relative to the carrier plate 6, even if the bias means 34 fails.

According to a first embodiment, which is shown in FIGS. 2 to 4, the security element 44 is a clamp.

In particular, the security element 44 at least partially encompasses the guide elements 14, 15 and the socket 12, thereby securing the guide elements 14, 15 to the socket 12.

By securing the guide elements 14, 15 to the socket 12, the security element 44 likewise secures the pressure plate 4 to the carrier plate 6, since the pressure plate 4 is fastened to the compression device 10, in particular to the outermost guide element 15 and the compression device 10, in particular the socket 12, is fastened to the carrier plate 6.

In the embodiment depicted in FIGS. 2 to 4, the security element 44 comprises a support element 46. The support element 46 abuts against the socket 12, in particular against a surface 48 of the flange 16 that is faced in a direction away from the guide elements 14, 15.

As can be seen in FIG. 4, the support element 46 has a through hole 50 which is congruent with the through hole 18 of the flange 16. Thus, the support element 46 may be screwed to the carrier plate 6 together with the socket 12.

In order to achieve a level adjustment or the compression device 10 at the carrier plate 6, the flange 16 at which the support element 46 is arranged is thinner than the other flange 16 by the thickness of the support element 46.

Furthermore, the security element 44 comprises a ring 52 which abuts against an axial end face 54 (see FIG. 4) of the guide element 15 that is faced away from the socket 12.

As shown in FIG. 4, the axial end 54 face of the guide element 15 may be stepped and thereby enables a form fitting engagement of the ring 52 with the guide element 15. In particular, the axial end face 54 is stepped such that the ring 52 does not protrude beyond the guide element 15 in an axial direction.

The security element 44 further comprises at least one bracket 56, in particular two brackets, which connects the support element 46 and the ring 52.

Preferably, the bracket 56 is arched, as shown in FIGS. 2 and 4.

The security element 44 may be formed from one piece, in particular the security element 44 is an injection moulded part.

For example, the security element 44 comprises thermoplastic polyurethane or consists of thermoplastic polyurethane.

FIGS. 5 to 8 visualize a further embodiment of an inventive compression device 10.

For identical structures with identical functions, which are known from the above design, the same reference signs are used in the following and reference is made in this respect to the previous explanations, whereby the differences of the respective design are dealt with in the following in order to avoid repetitions.

The compression device according to FIGS. 5 to 8 differs from the compression device 10 according to FIGS. 2 to 4 in the form of the security element 44. In particular, the security element 44 according to FIGS. 5 to 8 is a flexible rod 58 which has an inherent stiffness.

The rod 58 extends from a free end of the outermost guide element 15 up to the socket 12, in particular to the flange 16.

At the free end of the guide element 15 a flap 60 may be formed to which the rod 58 may be fastened.

As for example shown in FIGS. 5 and 6, the rod 58 is inclined with respect to a longitudinal axis of the compression device 10.

In the embodiment shown in FIGS. 5 to 8, the rod 58 is straight. In a further embodiment, the rod 58 may be curved.

The invention claimed is:

1. A telescopic compression device for a flat bed die-cutting, stripping, and/or part separating machine, the telescopic compression device comprising:
- a socket;
- a first guide element arranged for telescopic sliding in the socket;
- a second guide element arranged for telescopic sliding in the first guide element, wherein the first guide element and the second guide element have mating features to inhibit relative angular motion between the first guide element and the second guide element;
- an elastic bias means which biases the second guide element towards a furthest extended position; and
- a security element which has an inherent stiffness and secures the second guide element to the socket.

2. The telescopic compression device according to claim 1, wherein the security element at least partially encompasses the second guide element and/or the socket.

3. The telescopic compression device according to claim 1, wherein the security element is flexible.

4. The telescopic compression device according to claim 1, wherein:
- the socket comprises a flange, and
- the security element comprises a support element which abuts against a surface of the flange that faces in a direction away from the guide element.

5. The telescopic compression device according to claim 4, wherein the security element comprises a ring which abuts against an axial end face of the second guide element that faces away from the socket.

6. The telescopic compression device according to claim 5, wherein the security element comprises at least one bracket, which connects the support element and the ring.

7. The telescopic compression device according to claim 1, wherein the security element is a rod.

8. The telescopic compression device according to claim 7, wherein the rod extends from a free end of the guide element up to the socket.

9. The telescopic compression device according to claim 7, wherein the rod is inclined relative to a longitudinal axis of the compression device.

10. The telescopic compression device according to claim 1, wherein the security element comprises thermoplastic polyurethane.

11. The telescopic compression device according to claim 1, wherein the security element is formed as one piece.

12. The telescopic compression device according to claim 1, wherein the second guide element is slidable into the socket against a force of the elastic bias means.

13. An exchange tool of a flat bed die-cutting, stripping, and/or part separating machine, the exchange tool comprising:

a carrier plate in which at least one through-hole is formed;

the telescopic compression device according to claim 1, inserted into the at least one through-hole such that the telescopic compression device protrudes from the carrier plate; and a pressure plate that is mounted at a free end of the telescopic compression device.

* * * * *